United States Patent
Von Wechgeln

(10) Patent No.: US 6,476,936 B1
(45) Date of Patent: Nov. 5, 2002

(54) METHOD FOR SCANNING SCREENED IMAGE MASTER IMAGES

(75) Inventor: Jörg Olaf Von Wechgeln, Wattenbek (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

(21) Appl. No.: 09/403,671

(22) PCT Filed: Jan. 22, 1998

(86) PCT No.: PCT/DE98/00191

§ 371 (c)(1),
(2), (4) Date: Dec. 7, 1999

(87) PCT Pub. No.: WO98/36555

PCT Pub. Date: Aug. 20, 1998

(30) Foreign Application Priority Data

Feb. 17, 1997 (DE) .......................................... 197 06 160

(51) Int. Cl.⁷ ............................. H04N 1/00; H04N 1/04; H04N 1/46; G06K 9/64
(52) U.S. Cl. ...................... 358/406; 358/474; 358/533; 358/534; 382/275
(58) Field of Search ................................. 358/406, 533, 358/534, 474; 382/275

(56) References Cited

U.S. PATENT DOCUMENTS

| | | | |
|---|---|---|---|
| 4,231,656 A | * 11/1980 | Dickey et al. | 355/71 |
| 4,907,096 A | 3/1990 | Stansfield et al. | 358/3.08 |
| 5,040,080 A | 8/1991 | Scholten | 358/3.07 |
| 5,202,772 A | 4/1993 | Muir | 358/1.9 |
| 5,333,064 A | * 7/1994 | Seidner et al. | 358/3.08 |
| 5,384,648 A | * 1/1995 | Seidner et al. | 358/525 |

FOREIGN PATENT DOCUMENTS

| | | |
|---|---|---|
| DE | 37 21 713 | 7/1988 |
| EP | 0 301 786 | 1/1989 |
| EP | 0 511 754 | 4/1992 |
| EP | 0 762 296 | 12/1997 |

OTHER PUBLICATIONS

European Patent Office—Patent Abstracts of Japan—Publication No. 08 051536—Publication Date Feb. 20, 1996—vol. 096, No. 006.
Patent Abstracts of Japan—vol. 097, No. 001 JP 08 242364.

* cited by examiner

Primary Examiner—Edward Coles
Assistant Examiner—Houshang Safaipour
(74) Attorney, Agent, or Firm—Schiff Hardin & Waite

(57) ABSTRACT

A method for opto-electronic scanning, by pixel and by line, of screened master photographic images with a sensing device. From the actual scanning, at least one master photographic image area that contains the grid scale is detected in the screened master photographic image. Subsequently, the picture values present in the local area of the detected grid scale area of the master photographic image are transferred by Fourier transformation to the frequency range as a spatial frequency spectrum, and, from the spatial frequency spectrum, the screen ruling and raster angle of the raster of the master photographic image are determined. For the determined raster angle and the determined screen rulings of the grid scale of the master photographic image, the optimal scan frequencies for Moiré-free scanning are determined from the spatial frequency spectrum. The optimal scan frequencies which determined the scanning fineness are set at the sensing device and then the screened master photographic image is scanned with the set optical scan frequencies, to obtain the picture values necessary for reproduction of the screened master photographic image.

3 Claims, 2 Drawing Sheets

METHOD FOR SCANNING SCREENED IMAGE MASTER IMAGES

BACKGROUND OF THE INVENTION

The invention is in the field of electronic reproduction technology and is directed to a method for pixel-by-pixel and line-by-line opto-electronic scanning of screened image masters.

In electronic reproduction technology, image values are acquired and further-processed in a scanner device, also referred to as a scanner, by pixel-by-pixel and line-by-line scanning of an image master to be reproduced with an opto-electronic scanner element. The scanner element is essentially composed of a light source for the illumination of the image master to be scanned and of an opto-electronic transducer. The scanner can be designed as a flat bed scanner or as a drum scanner.

In practice, screened image masters must often be scanned. The raster of an image master to be scanned is defined by the screen frequency (screen dots/cm) and by the screen angle, whereas the scan fineness in the scanning of the image master is determined by the scan frequency (pixels/cm), whereby screen frequency and scanning frequency are spatial frequencies.

Beat frequencies as sums and differences between the sampling frequency and the harmonics of the screen frequency arise when scanning a screened image master. Low beat frequencies cause a visible Moiré that a viewer considers disturbing and, thus, diminishes the reproduction quality.

Patent Abstracts of Japan, Vol. 096, No. 006, Jun. 28, 1996, and JP 08 051536 A already disclose a method for avoiding moiré in scanning masters that arises due to image enlargement. In this known method, the image values are subjected to a Fourier transformation for the recognition of moiré, and the moiré is eliminated by a following spatial filtering.

Patent Abstracts of Japan, Vol. 097, No. 001, Jan. 31, 1997 and JP 08 242364 A disclose another method for avoiding moiré when scanning masters on the basis of a spatial filtering.

EP 0 511 754 A and EP 0 301 786 A recite methods for the descreening of screened masters by filtering.

SUMMARY OF THE INVENTION

It is therefore an object of the present invention to improve a method for scanning screened image masters such that disturbing Moiré phenomena are avoided or are at least greatly reduced.

According to the present invention, a method is provided for pixel-by-pixel and line-by-line opto-electronic scanning of a screen image master with a scanner device. Before the actual scanning of the master, at least one master area as a screen area containing a screen is identified in the screened image master. Image values of the identified screen area of the image master present in a locus domain are converted by a Fourier transformation into a frequency domain as a spatial frequency spectrum. Screen width and screen angle of the screen of the image raster are identified from the spatial frequency spectrum. Scan frequencies from the spatial frequency spectrum that are optimum for a Moiré-free scanning are determined for the identified screen angle and the identified screen width of the screen of the image master. The optimum scan frequencies that determine the scan fineness are set at the scanner device. The screen image master is scanned with the set optimum scan frequencies for acquiring image values required for reproduction of the screened image master.

The invention is explained in greater detail with reference to FIGS. 1 and 2.

DESCRIPTION OF THE PREFERRED EMBODIMENTS

The inventive method for pixel-by-pixel and line-by-line opto-electronic scanning of screened image masters is described in greater detail below. The image masters are, for example, screened black/white masters, screened color separations or printed color images that contain no gray scale values (contone). The screened image masters can contain areas with text and areas with screened images (screen areas).

In a first method step, at least one "screen area" containing the screen structure is identified in the screened image master by evaluating the image value.

For that purpose, the screened image master is first scanned in a scanner with a coarser scanning fineness then the scanning fineness required for the reproduction of the image master (coarse scan). In the coarse scan, a low-pass filtering of the scanned image information is simultaneously implemented. What the low-pass filtering achieves is that gray scale values are generated despite scanning the raster points as black/white information in the image master. The low-pass filtering occurs, for example, on the basis of an unsharp scanning with a magnified picture element diaphragm.

The functioning of a scanner is notoriously known, so that a more detailed description of its functioning is superfluous. For example, the flat bed scanner "TOPAZ" of Linotype-Hell AG can be employed.

When the scanner is calibrated such that the image value is 100% when scanning "white" and 0% when scanning "black", an area of the master is then recognized as a "screen area" when the scanned image values of the coarse scan are gray scale values in the medium tone area of, for example, 30% through 70%. At the same time, the boundaries of the screen area are marked by locus coordinates.

The coarse scan of the screened image master can be aborted as soon as a "screen area" has been found in the scanned image master, as a result whereof scan time in the coarse scan is advantageously saved.

In a second method step, the identified "screen area" of the image master is scanned in the scanner with a higher scan fineness (fine scan) compared to the scan fineness of the coarse scan, and the image values of the "screen area", for example 512×512 image values, are stored for later evaluation. The limitation of the scan to the "screen area" of the image master occurs with the assistance of the previously identified locus coordinates.

In a third method step, the image values of the "screen area" that are present in the locus domain are converted into the frequency domain by a two-dimensional Fourier transformation FT, preferably by a fast Fourier transformation (FFT). Such Fourier transformations are likewise known and described, for example, in Rabiner, L. R., "Theory And Application Of Digital Signal Processing", Chapter 6, 1975 ISBN 0-13-914101-4.

Figure 1:
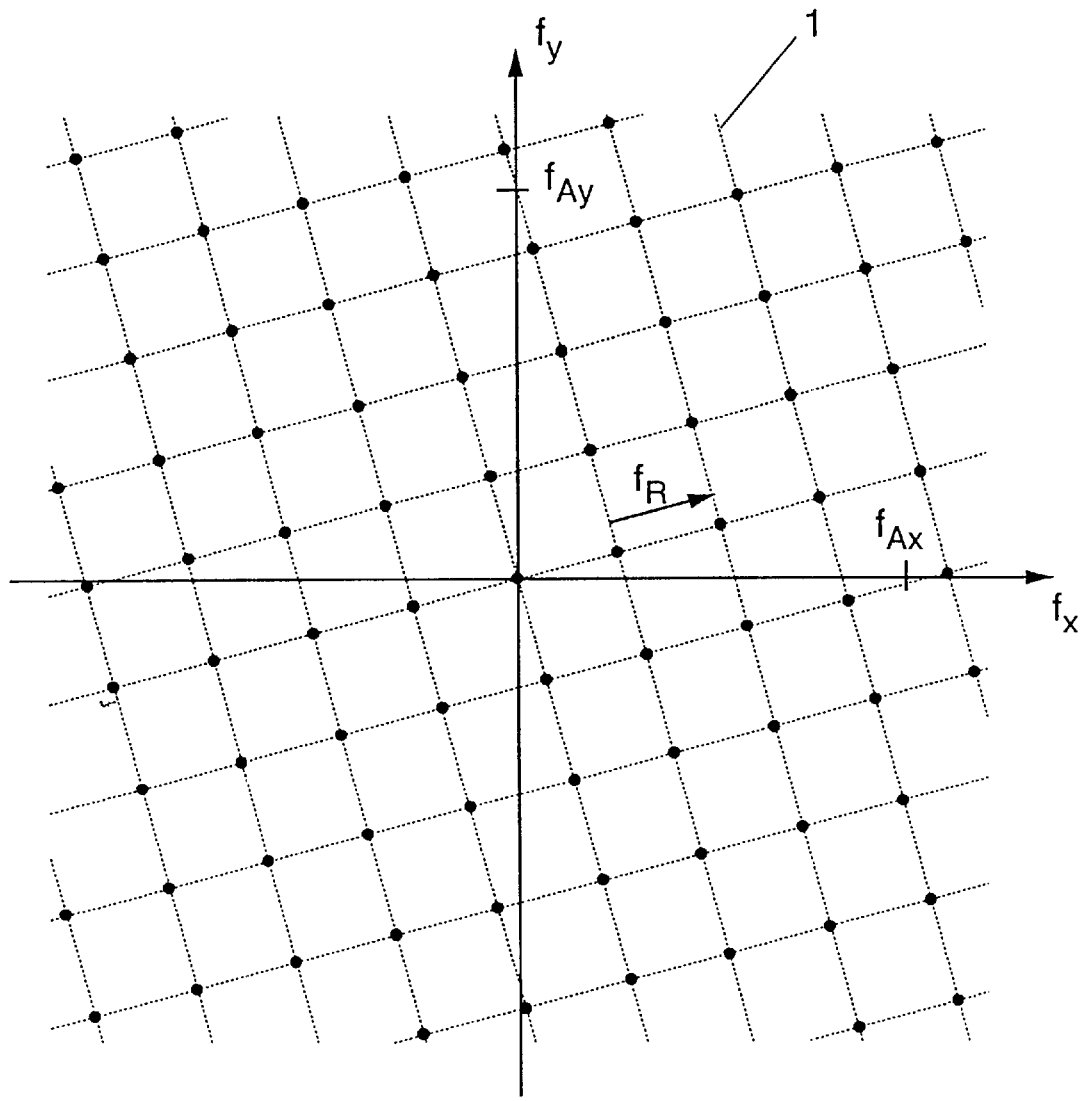
FIG. 1 illustrates a frequency spectrum.

FIG. 1 shows the spatial frequency spectrum of the screen of the scanned image master for a screen angle of, for example, 15°. When scanning screened color separations with different screen angles, a corresponding spatial frequency spectrum derives for each screen angle. The maximums of the spatial frequencies (harmonics) of the screen frequency $f_R$ that are defined by the frequencies $f_x$, $f_y$ lie in the intersections of the lines of the grid network 1. The frequency $f_x$ is allocated, for example, to the line direction and the frequency $f_y$ is allocated to the feed direction during the scanning of the master in the scanner.

A sampling frequency $f_{Ax}$ and a sampling frequency $f_{Ay}$ are entered on the frequency axes of the spatial frequency spectrum. Given pixels assumed to be square, the image master being resolved into these during the scanning, the scanning frequencies in the direction of the $f_x$ frequency axis and of the $f_y$ frequency axis of the spatial frequency spectrum are equal $f_{Ax}=f_{Ay}$, so that only a quadrant or, respectively, a frequency axis of the spatial frequency spectrum can be observed later.

In a fourth method step, screen angle and screen width of the screen of the screened image master are identified from the spatial frequency spectrum according to defined search criteria. This can occurs, for example, by recognizing the maximums in the spatial frequency spectrum in that respectively first harmonics are investigated. The determination of screen angle and screen width can preferably occur with an automatic analysis of the spatial frequency spectrum in a scanner or in a work station.

In a fifth method step, suitable scanned frequencies $f_{Ax}=f_{Ay}$ for the actual scanning of the screened image master are sought from the spatial frequency spectrum for the screen angle and the screen width that had been identified in the fourth method step.

Figure 2:
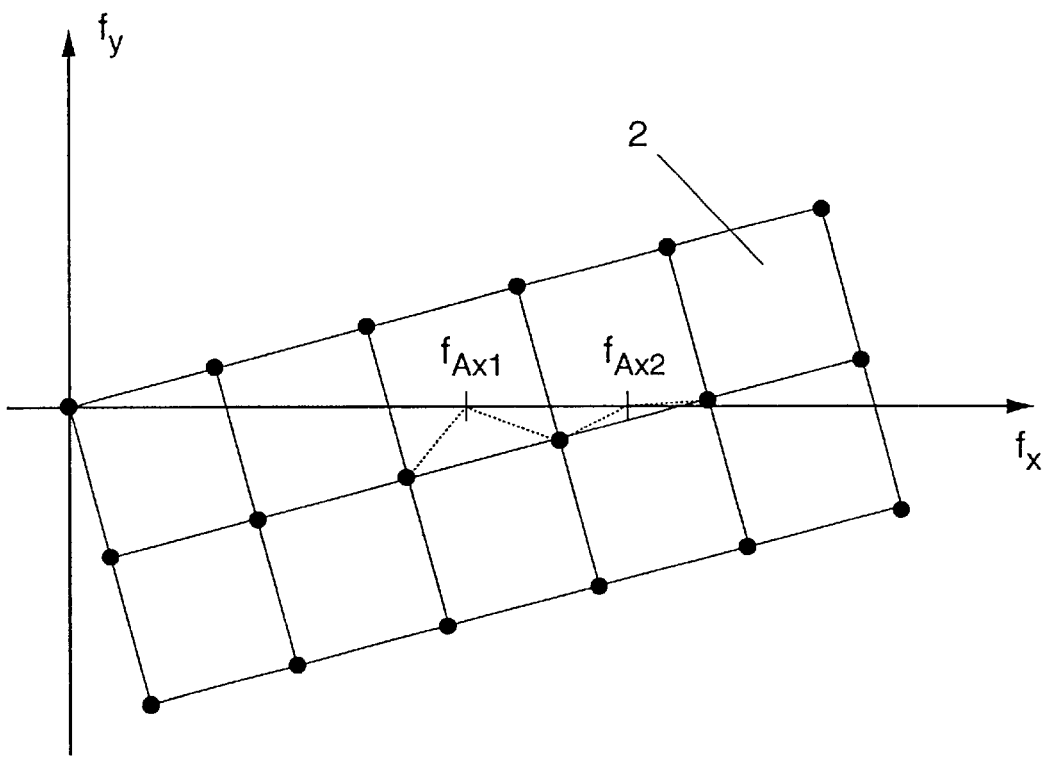
FIG. 2 illustrates an enlarged portion from the frequency spectrum.

For the purpose, FIG. 2 shows an enlarged portion from the spatial frequency spectrum of FIG. 1 along the $f_x$ frequency axis. Suitable sampling frequencies $f_{Ax}$ can lie in each of the grid meshes 2 of the spatial frequency spectrum on the $f_x$ frequency axis. The suitable scanning frequency $f_{Ax}$ in a grid mesh 2 is identified by a distance evaluation of the corresponding harmonic frequencies (corner points of the grid mesh). For example, that frequency that has the same spacing from the two closest harmonic frequencies of the corresponding grid mesh 2 is determined as suitable scan frequency $f_{Ax}$ in a grid mesh 2.

FIG. 2 shows the suitable scan frequencies $f_{Ax1}$ and $f_{Ax2}$ in two grid meshes 2, whereby the scan frequency $f_{Ax1}$ is preferred over the scan frequency $f_{Ax2}$, since it has the greater distances from the harmonic frequencies and, thus, a minimum of disturbing Moiré is achieved. In particular, $f_A > f_R$ should apply.

That scan frequency $f_{Ax}$ which can be optimally realized in the scanner provided for the scanning of the screened image master is then selected from among the suitable scan frequencies $f_{Ax}$. Given a pixel resolution assumed to be quadratic, $f_{Ax}=f_{Ay}$ then applies.

In a flat bed scanner, the scanner element comprises a photo diode line (CCD line) oriented in the line direction as a opto-electronic transducer and comprises a vario lens for line-by-line imaging of the image master onto the photodiode line. The image master to be scanned is arranged on a master table that moves perpendicular to the line direction (feed direction). Given the flat bed scanner, the vario lens with which the image master is imaged line-by-line onto the photodiode line of the scanner element is set in the x-direction according to the optimum scan frequency $f_{Ax}$, whereas the optimum scan frequency $f_{Ay}$ in the y-direction determines the feed rate of the master table.

In a drum scanner, the image master to be scanned is clamped on a scanner drum that rotates in the line direction (circumferential direction). The scanner element with a photo-multiplier as the opto-electronic transducer moves past the scanner drum in the axial direction (feed direction). Given the drum scanner, the sampling frequency in the analog-to-digital conversion of the image signal is selected according to the optimum scan frequency $f_{Az}$ in x-direction, whereas the optimum scan frequency $f_{Ay}$ in the y-direction determines the feed rate of the scanner element along the scanner drum.

In a sixth method step, the screened image masters to be reproduced are then scanned again in the scanner as a fine scan with the previously identified, optimum scan frequencies $f_{Ax}$, $f_{Ay}$, or, respectively, scan finenesses in the line and the feed direction, and the Moiré-free image values that are thereby acquired are further-processed.

When the screened image masters are, for example, the four color separations of a color set, the individual color separations are successively scanned with the scan frequencies determined as optimum for the respective color separation as a fine scan, and the Moiré-free image values thereby acquired are digitally de-screened by a low-pass filtering. The half-tone color separations (contone separations) are then calculated from the de-screened image values. Alternatively, the Moiré-free image values can also be further-processed as a line work without a corresponding low-pass filtering.

Although various minor changes and modifications might be proposed by those skilled in the art, it will be understood that my wish is to include within the claims of the patent warranted hereon all such changes and modifications as reasonably come within my contribution to the art.

I claim:

1. Method for pixel-by-pixel and line-by-line opto-electronic scanning of screened image masters with a scanner device, characterized in that, before the actual scanning of the master, at least one master area (screen area) containing the screen is identified in the screened image master;

the image values of the identified screen area of the image master present in the locus domain are converted by a Fourier transformation into the frequency domain as spatial frequency spectrum;

screen width and screen angle of the screen of the image master are identified from the spatial frequency spectrum;

the scan frequencies ($f_{Ax}$, $f_{Ay}$) from the spatial frequency spectrum that are optimum for a Moiré-free scanning are determined for the identified screen angle and the identified screen width of the screen of the image master;

the optimum scan frequencies ($f_{Ax}$, $f_{Ay}$) that determine the scan fineness are set at the scanner device; and the screened image master is scanned with the set, optimum scan frequencies ($f_{Ax}$, $f_{Ay}$) for acquiring the image values required for the reproduction of the screened image master.

2. A method for pixel-by-pixel and line-by-line opto-electronic scanning of a screened image master with a scanner device wherein before the actual scanning of the master, performing the steps of:

identifying at least one master area as a screen area containing a screen identified in the screened image master;

converting image values of the identified screen area of the image master present in a locus domain by a Fourier transformation into a frequency domain as a spatial frequency spectrum;

identifying screen width and screen angle of the screen of the image master from the spatial frequency spectrum;

determining scan frequencies from the spatial frequency spectrum that are optimum for a Moiré-free scanning for the identified screen angle and the identified screen width of the screen of the image master;

setting the optimum scan frequencies that determine scan fineness at the scanner device; and scanning the screened image master with the set optimum scan frequencies for acquiring image values required for reproduction of the screened image master.

3. A method for opto-electronic scanning of a screened image master with a scanner device wherein before the actual scanning of the master, performing the steps of:

identifying at least one master area as a screen area containing a screen identified in the screened image master;

converting image values of the identified screen area of the image master at a locus by a Fourier transformation into a frequency domain as a spatial frequency spectrum;

identifying screen width and screen angle of the screen of the image master from the spatial frequency spectrum;

determining scan frequencies from the spatial frequency spectrum that are substantially optimum for a substantially Moiré-free scanning for the identified screen angle and the identified screen width of the screen of the image master;

setting the optimum scan frequencies that determine scan fineness at the scanner device; and scanning the screened image master with the set optimum scan frequencies for acquiring image values required for reproduction of the screened image master.

* * * * *